(12) United States Patent
Manning et al.

(10) Patent No.: US 8,352,729 B2
(45) Date of Patent: Jan. 8, 2013

(54) SECURE APPLICATION ROUTING

(75) Inventors: Robert S. Manning, Leander, TX (US); Linda A. Zimmer, Austin, TX (US); Jos M. Accapadi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 991 days.

(21) Appl. No.: 12/181,452

(22) Filed: Jul. 29, 2008

(65) Prior Publication Data
US 2010/0031019 A1 Feb. 4, 2010

(51) Int. Cl.
H04L 29/06 (2006.01)
(52) U.S. Cl. .................. 713/153; 713/154; 713/160
(58) Field of Classification Search .......... 713/153, 713/154, 160
See application file for complete search history.

(56) References Cited

U.S. PATENT DOCUMENTS

| 5,369,707 | A | 11/1994 | Follendore, III |
| 5,577,209 | A | 11/1996 | Boyle et al. |
| 5,781,550 | A | 7/1998 | Templin et al. |
| 6,108,787 | A | 8/2000 | Anderson et al. |
| 6,304,973 | B1 * | 10/2001 | Williams ................ 726/3 |
| 6,510,464 | B1 | 1/2003 | Grantges, Jr. et al. |
| 6,993,582 | B2 | 1/2006 | Holden et al. |
| 7,143,290 | B1 | 11/2006 | Ginter et al. |
| 7,343,421 | B1 | 3/2008 | Goyal |
| 7,343,622 | B1 | 3/2008 | Woodall |
| 7,356,695 | B2 | 4/2008 | LiVecchi |
| 7,360,210 | B1 | 4/2008 | Vacanti et al. |
| 2003/0014665 | A1 * | 1/2003 | Anderson et al. ............. 713/201 |
| 2004/0015689 | A1 * | 1/2004 | Billhartz ........................ 713/156 |
| 2005/0198250 | A1 * | 9/2005 | Wang ............................ 709/223 |
| 2006/0015943 | A1 * | 1/2006 | Mahieu ........................... 726/25 |
| 2007/0157307 | A1 * | 7/2007 | Katoh et al. .................... 726/14 |
| 2007/0226493 | A1 * | 9/2007 | O'Brien et al. ............... 713/166 |
| 2007/0277034 | A1 * | 11/2007 | LiVecchi ....................... 713/166 |
| 2008/0022389 | A1 * | 1/2008 | Calcev et al. ................... 726/14 |

OTHER PUBLICATIONS

Solms et al., Managing Multi Level Security in a Military Intranet Environment, Computers & Security, vol. 18, Issue 3, Jun. 1999, pp. 257-270.*
Han et al., Multi-Path Security-Aware Routing Protocol Mechanism for Ad Hoc Network, Aug. 2006, Retrieved from http://ieeexplore.ieee.org/stamp/stamp.jsp?tp=&arnumber=4021159, pp. 1-7.*
Khokhar et al., TARP: Trust-Aware Routing Protocol, Jul. 2006, Retrieved from http://www.utc.edu/Faculty/Li-Yang/cns-reading/routing-trust-mobile-p135-abusalah.pdf, pp. 1-6.*
Smith, Rick Dr; Introduction to Multilevel Security; Dec. 2007; University of St. Thomas, MN; http://www.cs.stthomas.edu/faculty/resmith/r/mls/index.html.

* cited by examiner

*Primary Examiner* — Carl Colin
*Assistant Examiner* — Chau Le
(74) *Attorney, Agent, or Firm* — David Mims; Robert C. Rolnik

(57) ABSTRACT

Disclosed is a computer implemented method and apparatus to secure a routing path. A local node receives a request for secure route identification from an upstream node. Responsive to receiving a request for secure route identification, the local node transmits a local node security level and an authentication key to the upstream node. The local node determines whether at least one downstream node is authentic and has sufficient security level from a second-level downstream node. The local node may then establish a socket to the upstream node.

18 Claims, 5 Drawing Sheets

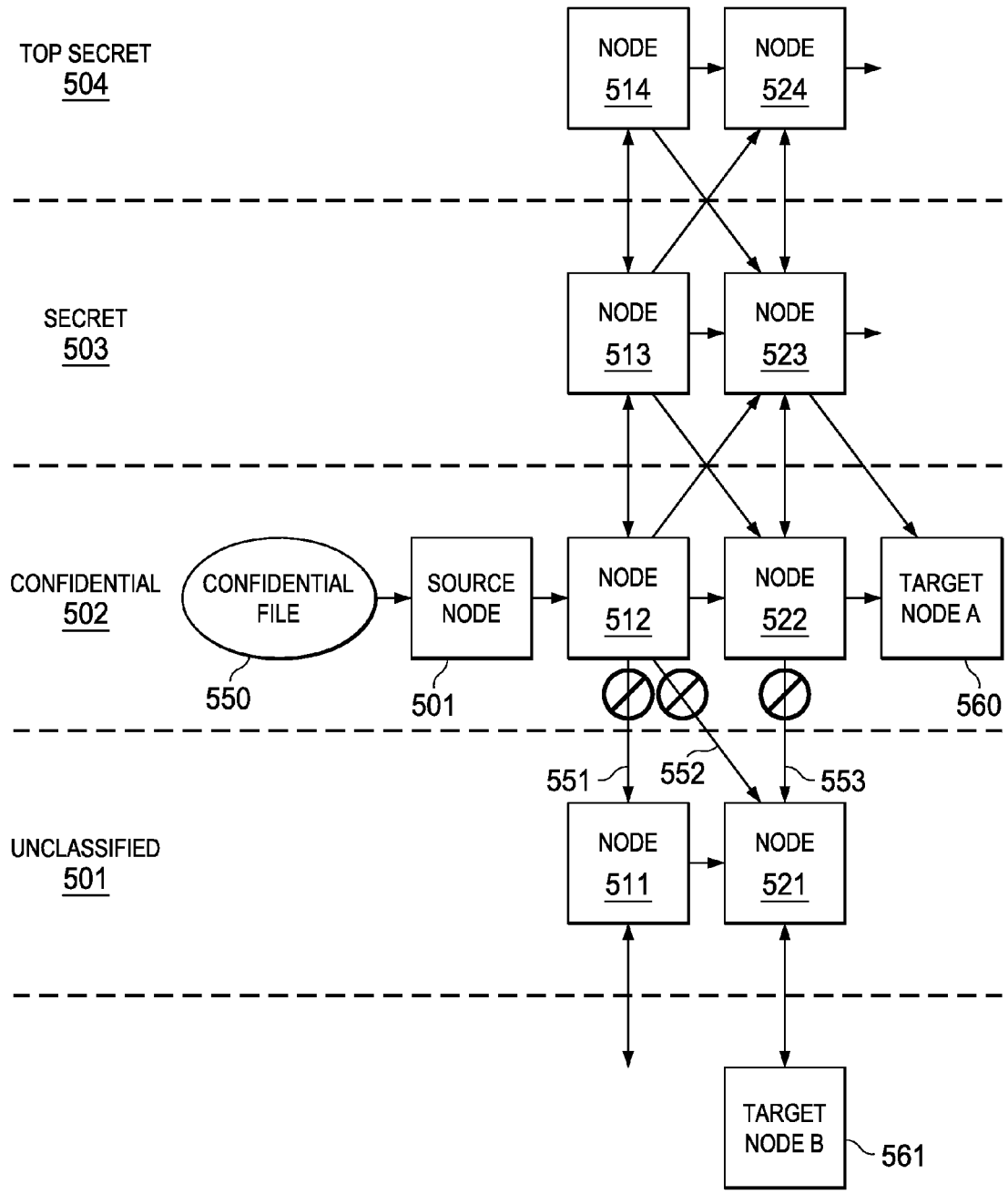

SECURE APPLICATION ROUTING

BACKGROUND OF THE INVENTION

1. Field of the Invention

The present invention relates generally to a computer implemented method, data processing system, and computer program product for routing packets in a network. More specifically, the present invention relates to checking a security level of each node and interconnecting links along a path for an intended file transmission, and using a node only if the security level is sufficient.

2. Description of the Related Art

Modern networks of routers or nodes send packets in a packet switched manner. A packet switched network is a network where data is transmitted in packets such that each occupies a cable for a relatively brief period as compared to any other data carried on the cable. By transmitting data as packets, instead of assigning a circuit for a continuous transmission, such networks permit enhanced sharing between applications and users of common network facilities, while providing many options to route around congestion that sometimes occurs at a node.

The nodes typically rely on many paths from source to destination in order to reduce congestion, delay or jitter in packet transmission. However, for security focused applications, these considerations are secondary to the desire to achieve secure traffic not intercepted by unknown persons or entities.

In governments as well as commercial enterprises, packets may be restricted to travel those nodes owned or controlled by the government, enterprise, or other entity. This feature achieves an initial level of security, but provides an assurance of security only to the extent that the weakest communication link is secured. Consequently, a file that is stored in a hardened server, with keyed physical access control may be exposed to a higher risk if an intermediate node in a data transfer is located in a leased space, with relaxed controls on personnel access. A file is an ordered set of bits stored to persistent storage, and capable of being copied and transmitted across, for example, a packet network.

SUMMARY OF THE INVENTION

The present invention provides a computer implemented method and apparatus to secure a routing path. A local node receives a request for secure route identification from an upstream node. Responsive to receiving a request for secure route identification, the local node transmits a local node security level and an authentication key to the upstream node. The local node determines whether at least one downstream node is authentic and has sufficient security level from a second-level downstream node. The local node may then establish a socket to the upstream node.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a network diagram of allowable and prohibited segments in a path from classified file to target node A in accordance with an illustrative embodiment of the invention.

DETAILED DESCRIPTION OF THE PREFERRED EMBODIMENT

Figure 1:
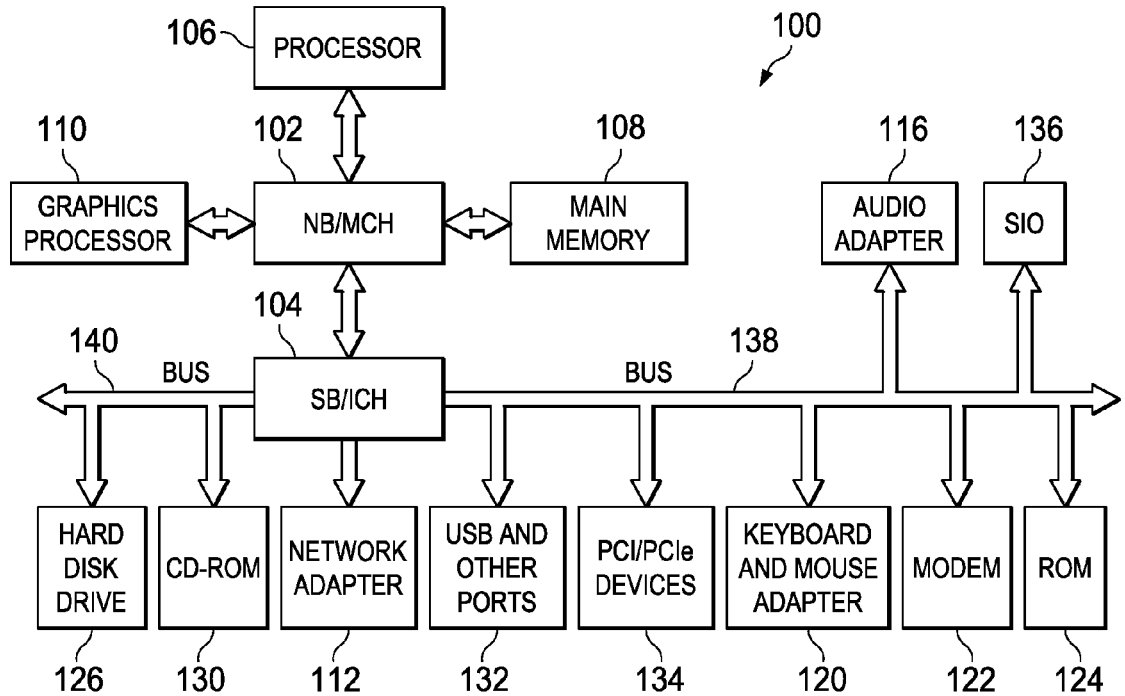
FIG. 1 is a data processing system in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106 and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module", or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The aspects of the illustrative embodiments provide a computer implemented method, data processing system, and computer program product for limiting the nodes traversed by packets when sending a file to only those nodes that are identified as having a sufficient security level.

Figure 2B:
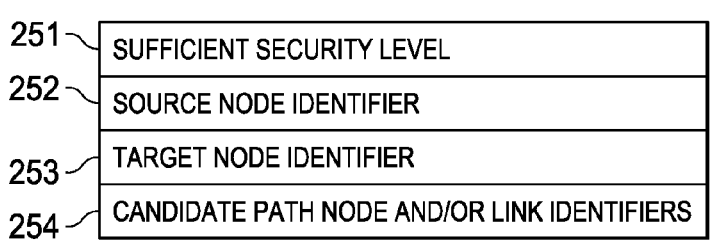
FIG. 2B is a packet forming a request for secure route identification in accordance with an illustrative embodiment of the invention.
Figure 2C:
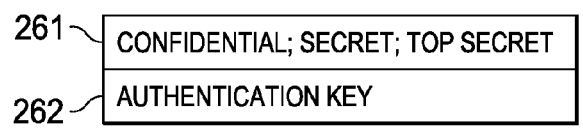
FIG. 2C is a data structure stored at a node to identify a security level of the node in accordance with an illustrative embodiment of the invention.
Figure 2A:
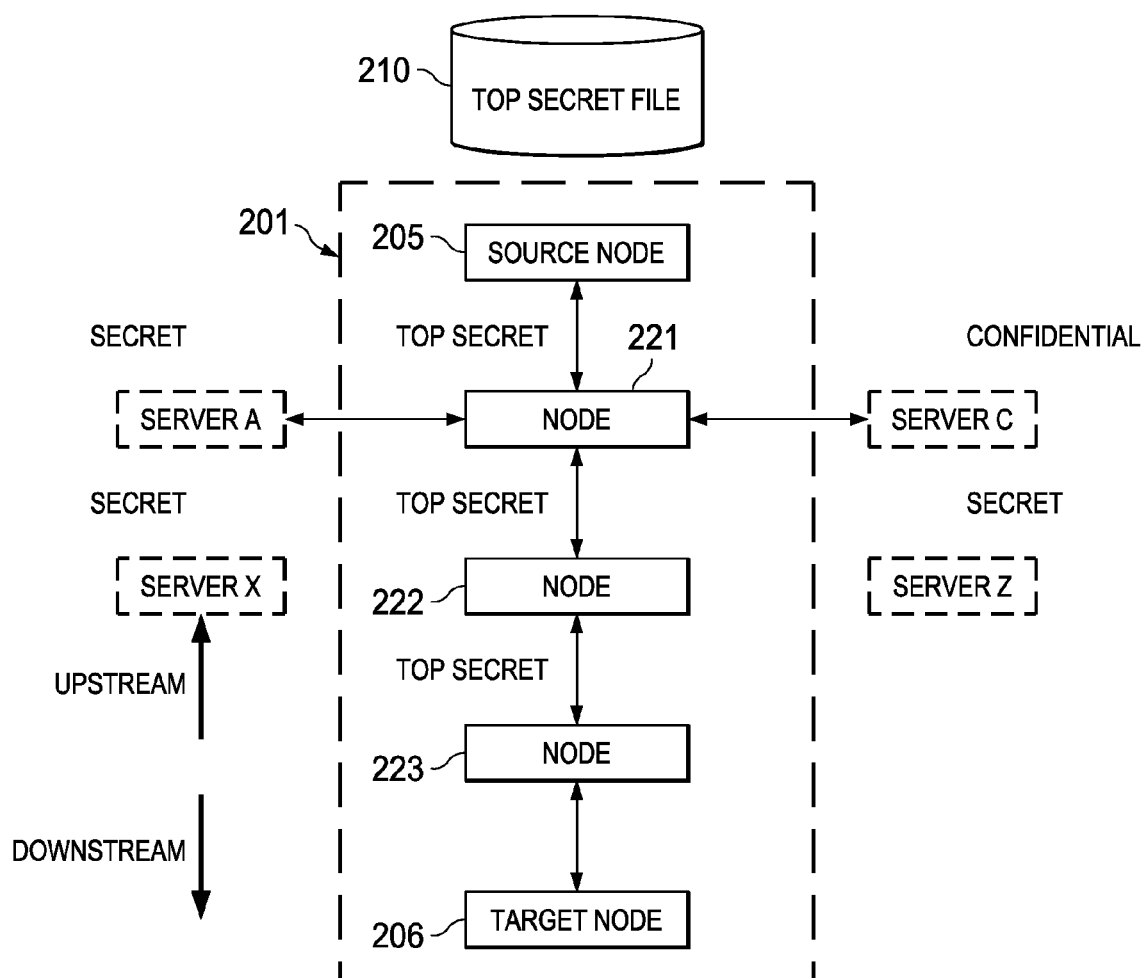
FIG. 2A shows a source node in a network of heterogeneous secure nodes in accordance with an illustrative embodiment of the invention.

FIG. 2A shows a source node in a network of heterogeneous secure nodes in accordance with an illustrative embodiment of the invention. Source node 205 stores top secret file 210. A user accessing source node 205 may transmit top secret file 210 to target node 206. A target node is a node to which a user requests a source node to send a file. The target node may have a target node identifier. The target node identifier can be, for example, a host name, an IP address, a domain name, among other names. The target node may be implicitly identified when a user transmits an email that includes a domain name associated with the target node.

Nodes accessible to both source node and target node 206 are subject to varying security protocols, and accordingly, may each be certified to have security levels along a spectrum. Security levels may have labels from lower security level to higher security level: 'unclassified'; 'confidential'; 'secret'; and 'top secret'. Additional and alternative labels may be applied, depending on the government or commercial enterprise. Source node 205 may select from among candidate neighbor nodes to determine a path to a target node. A neighbor node is a node that is separated by a single conduit or link from the local node. A node can be, for example, an endpoint data processing machine, a router, among other data processing machines. A routing table is a database that stores the routes to one or more network nodes. By contrast, illustrative embodiments of the invention may use an independent secure routing table on each node. The secure routing table may store the association between a secured route and a classification level. The secure routing table can exist independently from a routing table of the operating system. Additionally, the secure routing table can be contained within a secure routing application.

Accordingly, heterogeneous networks operate with nodes and connecting links having varying security levels. A security level is the believed, actual, or mistaken identifier assigned to either a node or an interconnecting link by a system administrator to indicate security levels believed to exist. In other words, the system administrator applies a label from among several security level options based on what the system administrator determines or otherwise selects to be a description of security placed around the node or link. To the extent that the security level assigned to a node or link is incorrect, the security level is an arbitrary label assigned to a node where there is at least one other option for setting a security level other than the one assigned the node. In short, each node and each link have unique identifiers assigned to them.

To maintain at least an equal level of confidence of uncompromised file access, top secret file 210 is sent across nodes and links that are the same security level or higher than "top secret". However, an arbitrary selection of nodes to transmit the packets bearing top secret file data will diminish security, at least with respect to that data. Path 201 can be used to deliver packets from source node to target node without a diminished security level node or link being along the download path of the file.

The description below of steps to select these nodes and interconnecting links, or avoid nodes and interconnecting links of diminished security level, refers to several relative terms that compare the data's assigned security level to those security levels of the candidate route, endpoint node and interconnecting links. Along a routing path, or candidate routing path, a node that is nearer a source node than a second node is said to be an upstream node relative to the second node. Accordingly, the second node is a downstream node relative to the first node. A second-level downstream node is a node that is downstream of a downstream node. For example, in FIG. 2A, node 223, is a second-level downstream node to node 221, by virtue of its being downstream of node 222, which is a downstream node to node 221. Upstream and downstream are adjectives to describe the activity or status of nodes in the relative configuration of FIG. 2A. A local node is a node that executes steps of a method, for example, through the operation of a processor, among other components (see FIG. 1). A local node security level is a security level description a system administrator assigns the local node. A link layer security classification is a security level description a system administrator assigns to a particular network link. A node may be connected to neighboring nodes by multiple links, each with varying levels of security. Accordingly, each link can be assigned distinct security levels.

FIG. 2B is a packet forming a request for secure route identification in accordance with an illustrative embodiment of the invention. A request for secure route identification is a packet sent by a node to an adjacent node or downstream node to request authentication of the downstream node and a security level of the downstream node and link to the downstream node. Request for secure route identification 250 includes, for example, sufficient security level 251, source node identifier 252, target node identifier 253, and optionally, one or more candidate path node and/or link identifiers 254. Each identifier may be an address, such as, for example, an IP address or link interface label that uniquely describes the associated node or link.

A sufficient security level is a label or number of the file to be transmitted from the source node. The sufficient security level identifies a threshold below which a node or link is unacceptable to be used in a path to transport the file of the source node. Accordingly, a downstream security level is compared against the sufficient security level. The downstream security level is the security level assigned to the downstream node and/or link by a network administrator.

FIG. 2C is a data structure stored at a node to identify a security level of the node in accordance with an illustrative embodiment of the invention. Data structure 260 may include, for example, security classification of the node 261, and authentication key for the node 262. A security classification is the one or more security levels that the node or link is assigned to protect. As stated above, the security classification is the number or name assigned to the node or link by a network administrator. A downstream security level can be the highest security classification that a node or link is allowed to protect. That is, the node or link is set to securely protect data of a certain classification, as well as protect data of all classifications below that classification. An authentication key is a key used to authenticate the node to another node. The authentication key can be used to authenticate and verify operation of the link between the two nodes. The authentication key may be, for example, a public key encryption pair. Thus, a downstream authentication key is an authentication key of a node that is downstream to the local node.

Figure 3:
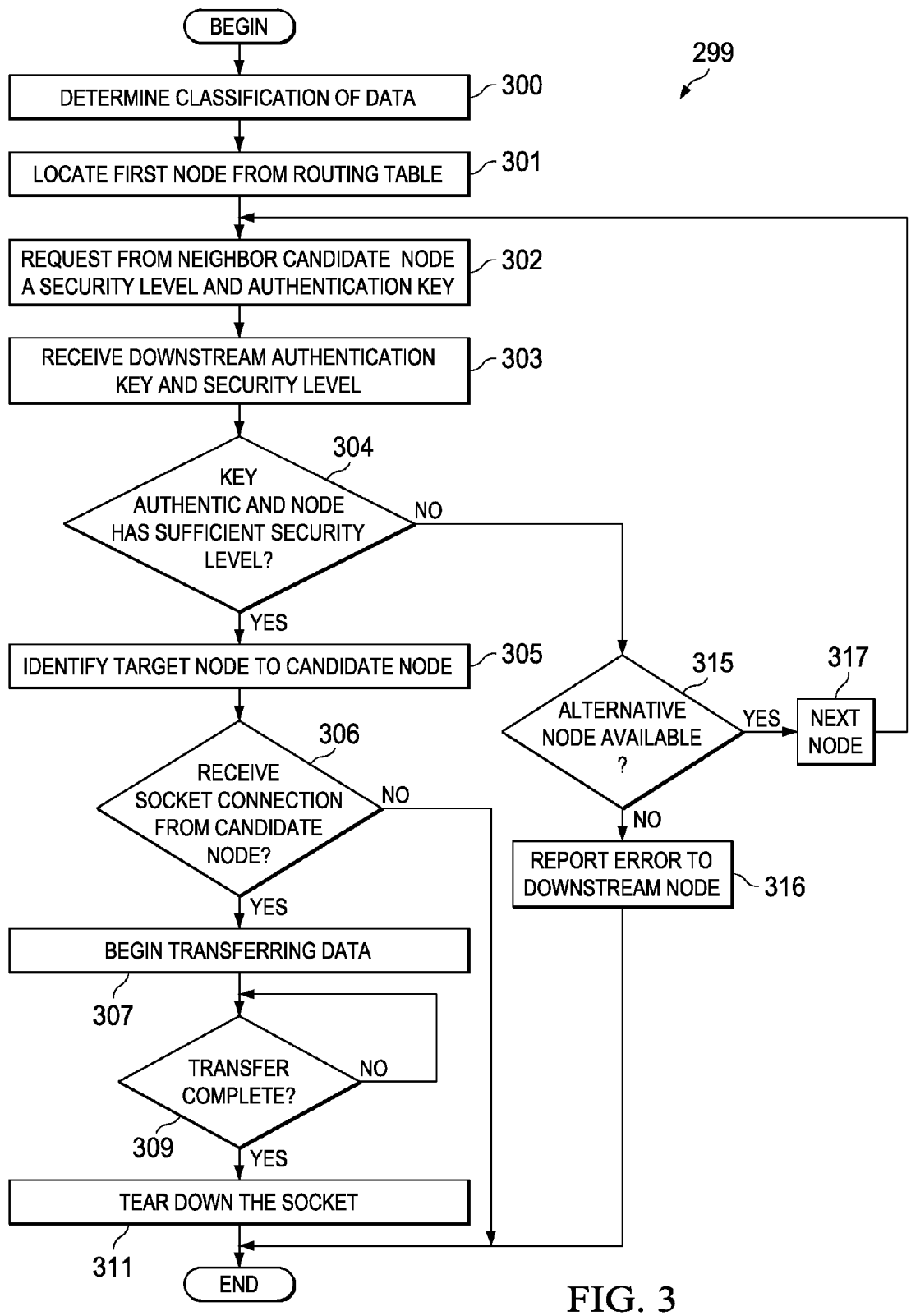
FIG. 3 is a flowchart of steps performed at a source node in accordance with an illustrative embodiment of the invention.

FIG. 3 is a flowchart of steps performed at a source node in accordance with an illustrative embodiment of the invention. The execution of the steps herein may be implemented as a daemon within a data processing system, such as, for example, data processing system 100 of FIG. 1. Initially a local node, for example, source node 205 of FIG. 2A, determines a classification of data (step 300). The classification of the applicable data file may be stored as metadata in a file system. Alternatively, the classification may be an XML tagged field of the data file. Next, the source node may locate a first node using a routing table (step 301). A candidate neighbor node is a node that is separated by a single link from the local node, and is identified in the local node's secure routing table. The first node can be node 1 221 of FIG. 2A. Next, the source node may request from a neighbor candidate node a security level and authentication key (step 302). A node making such a request is requesting secure route identification. The request is in the form of a request for secure route identification, for example, request for secure route identification 250 of FIG. 2B, above.

The local node may receive the downstream authentication key and security level (step 303). The received response from the downstream node is called secure route identification. Secure route identification includes at least authentication information, such as an authentication key of the downstream node. In response, the local node may determine if the authentication key is authentic, and if the downstream node has a sufficient security level (step 304). If one or more such determinations are negative, the local node determines if an alternative node is available (step 315). To be available, the node is downstream and directly connected to the local node. A positive determination to step 315 causes the local node to treat the node as the next node to check (step 317). Processing continues at step 302 using the node assignment of step 317. A negative determination at step 315 causes an error report (step 316) to be sent to the downstream node, such as node 222 in FIG. 2A. Processing terminates thereafter.

A positive outcome to step 304 indicates that the candidate node evaluated at step 304 can provide a secure connection from local node to that candidate node. Next, the local node identifies the target node to the candidate node (step 305). The local node determines if it received a socket connection from the candidate node (step 306). A socket is an end-point of a bidirectional process-to-process communication flow across an IP based network, such as the Internet. If no socket connection is received, processing terminates.

However, a positive result to step 306 may cause the local node to begin transferring data to the downstream node (step 307). A downstream node can delay establishing the socket based on latencies in setting up path segments downstream of the downstream node. The local node has formed a segment of a routing path that can transport a file such that at least the downstream node of the segment is determined to have a sufficient security level. The complete routing path is established based on the operation of flowchart 299 at the local node, as well as flowchart 400, below, at any downstream nodes. Accordingly, each flowchart illustrates how to establish at least one segment in the routing path.

In an alternative illustrative embodiment, the step 309 may be accompanied by the local node logging details of the transfer to a log file. The logged details may include the source node address, and the destination node address, among others.

Returning to FIG. 3, next, the local node may determine if the transfer is complete (step 309). If the transfer is not complete, the local node may repeatedly check to see if the transfer is complete until the transfer is complete. Next, the local node may tear down the socket (step 311). Processing terminates thereafter. A transfer of a file is a transmittal of at least one packet that carries content of a file. The transfer of a file can include operations such as acknowledging packets sent, assembling packets in order, and performing consistency checks, among other steps. Completing file transfer can include the transmittal and reception of a packet that acknowledges receipt of the entire file, or at least a final packet that contains a final remaining portion of a file.

Figure 4:
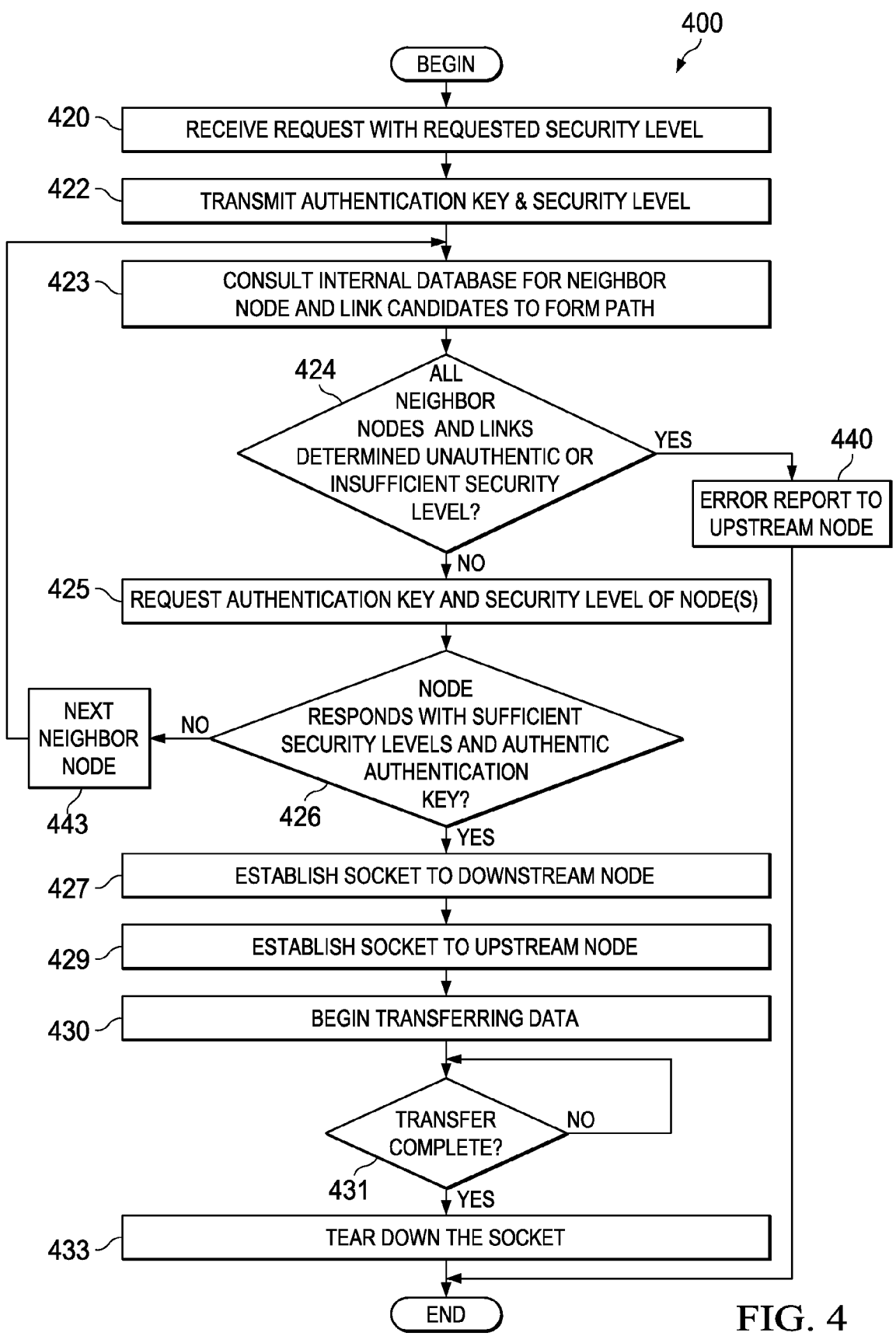
FIG. 4 is a flowchart of steps performed at a node in accordance with an illustrative embodiment of the invention.

FIG. 4 is a flowchart 400 of steps performed at a node in accordance with an illustrative embodiment of the invention. The node may be downstream from another node, and accordingly, be a downstream node in relation to the other node. Similarly, the other node is upstream to the local node, and thus, is an upstream node. Initially, the local node receives a request having a requested security level (step 420). The request may be a request for secure route identification, for example, packet 250 of FIG. 2B. The local node may respond by transmitting the authentication key and the security level of the local node (step 422) (see data structure 260 of FIG. 2B). Next, the local node may consult an internal database for neighbor node and link candidates to form a path (step 423). The internal database may be, for example, a routing table, however the internal database can be a secure routing table, separate from a generic routing table of the node.

Next, the local node may detect if any errors have occurred. For example, the local node may determine if all neighbor nodes and links are determined unauthentic or have an insufficient security level (step 424). If an error is detected, the local node sends an error report (step 440). The error may be reported to the upstream node. Processing terminates thereafter.

A negative determination at step 424 may result in the local node requesting an authentication key and security level of downstream nodes (step 425). Next, the local node determines if a node responds with sufficient security level(s) and an authentic authentication key (step 426). A negative determination may lead the local node to lookup a next neighbor node (step 443). If an alternative node and corresponding link is available, that node is selected as the next node for processing. Processing may continue to repeat step 323 to allow a traversal of as many neighbor nodes and links as may be necessary to find a neighbor node and link having a sufficient security level and an authentic response.

A positive determination to step 426, however, may cause the local node to establish a socket to the downstream node (step 427). Next, the local node may establish a socket to the upstream node (step 429). A socket is a session that uses a transport protocol to exchange data between two nodes. The transport protocol may be transport control protocol (TCP). A secure socket is a socket that provides end-to-end encryption and authentication of nodes. The secure socket may be, for example, according to secure sockets layer (SSL), transport layer security (TLS) or similar protocols. In FIG. 4, the sockets established may be, for example, secure sockets. The upstream node may be the source node.

The local node may begin transferring data (step 430). Transferring may include receiving a packet from an upstream node and forwarding the packet to a downstream node. The local node may repeatedly check to determine whether the transfer is complete (step 431). A positive result to step 431 causes the local node to tear down the socket (step 433). Processing may terminate thereafter.

An alternative illustrative embodiment may skip step 423, and instead obtain the address for a downstream node by receiving an address for the at least one downstream node from the upstream node. The requesting step and determining step, steps 425 and 426, respectively, may be based on the address.

FIG. 5 is a network diagram of allowable and prohibited segments in a path from classified file to target node A 560 in accordance with an illustrative embodiment of the invention. Network 500 is arranged in four tiers of nodes: top secret 504, secret 503, confidential 502, and unclassified 501. Confidential file can be transmitted by testing neighboring nodes in the manner described above. Among nodes neighboring node 501, that is, node 511, node 512, node 513, and node 514, only three nodes have a sufficient security level to receive confidential file 550. These nodes are node 512, node 513, and node 514. Node 511 is excluded because the link 551 and/or node 511 is below the security level of the confidential file. In this example, the confidential file 550 is marked "confidential" while node 511 has a secure route identification of "unclassified." This exclusion occurs because of the sufficient security level being set to 'confidential', which may correspond to a number 2.

It is appreciated that the number ranking is somewhat arbitrary. A helpful feature can be to arrange the numbers assigned to each security level such that each security level corresponds to a number such that the security level is higher or stricter when associated with a high number, while a security level is relatively lower, or more relaxed, when that security level is associated with a low number.

Node 521 may make similar requests to downstream nodes, such as, for example node 521, node 522, node 523 and node 524. Among these nodes, node 521 may be excluded for the reason that it has a security level below the sufficient security level. In a similar fashion, node 521 may also be excluded from being used in a path to transmit confidential file 550 when a request is issued by node 522. Thus, at least three segments of the network are excluded for use in the processes defined by flowcharts in FIGS. 3 and 4. These segments include segment 551, segment 552, and segment 553. In a similar fashion, node 522 may request for a security level of target node A 560. In response, target node A 560 may reply that it has a security level of 'confidential'. Accordingly, at node 522, a determination is made that target node A 560 is an acceptable downstream node for receiving a file having the security level of 'confidential'.

An alternative target node B 561, which may be specified by a user, may be identified as having an insufficient security level through an error message. In addition, if target node B 561 were a malicious node having access to node 521, then target node B 561 would be unable to monitor any packets transmitted in the manner described above for the reason that node 521 is excluded from the path of such packets.

The illustrative embodiments permit a user to transmit a file across a heterogeneous network in such a manner that network nodes having an insufficient security level are excluded from the path taken by the file to reach the target node identified by the user. Accordingly, a confidential file may be transported across the heterogeneous network while assuring that the file did not pass through any nodes that a network administrator identified as having a security level below the sufficient security level.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for securing a routing path, the method comprising:
    receiving a request for secure route identification from an upstream node;
    responsive to receiving the request for secure route identification, transmitting a local node security level and an authentication key to the upstream node;
    determining whether at least one downstream node is authentic and has sufficient security level from a second-level downstream node;
    receiving an address for the at least one downstream node from the upstream node, wherein the determining whether the at least one downstream node is authentic and has sufficient security level from a second-level downstream node is based on the address for the at least one downstream node;
    establishing a socket to the upstream node;
    requesting secure route identification from the at least one downstream node;
    receiving a downstream security level and a downstream authentication key from the at least one downstream node;
    determining that the downstream security level is a sufficient security level;
    determining that the downstream authentication key is authentic; and
    responsive to a determination that the downstream authentication key is authentic and the downstream security level is the sufficient security level, establishing a socket to the at least one downstream node.

2. The computer implemented method of claim 1, further comprising:
    receiving a target node from the upstream node;
    responsive to establishing the socket to the upstream node, transferring a file;
    determining that a transfer of a file from the upstream node to the target node is complete; and
    responsive to a determination that the transfer of the file from the upstream node to the target node is complete, tearing down the socket.

3. The computer implemented method of claim 1, further comprising:
    transmitting a target node identifier to the at least one downstream node.

4. The computer implemented method of claim 3, further comprising:
    logging a source node identifier and the target node identifier.

5. The computer implemented method of claim 1, wherein requesting secure route identification further comprises:
    looking up a neighbor node based on the request for secure route identification from the upstream node to form a candidate neighbor node, the request having a sufficient security level; and
    responsive to forming the candidate neighbor node, requesting secure route identification from the candidate neighbor node.

6. A computer implemented method for securing a routing path, the method comprising:
    receiving a request for secure route identification from an upstream node;
    responsive to receiving the request for secure route identification, transmitting a local node security level and an authentication key to the upstream node;
    determining whether at least one downstream node is authentic and has sufficient security level from a second-level downstream node;
    establishing a socket to the upstream node;
    requesting secure route identification from the at least one downstream node;
    looking up the at least one downstream node in a routing table;
    wherein requesting secure route identification from the at least one downstream node is responsive to looking up the at least one downstream node;
    receiving a downstream security level and a downstream authentication key from the at least one downstream node;
    determining that the downstream security level is a sufficient security level;
    determining that the downstream authentication key is authentic; and
    responsive to a determination that the downstream authentication key is authentic and the downstream security level is the sufficient security level, establishing a socket to the at least one downstream node.

7. A computer program product for securing a routing path, the computer program product comprising: a computer-readable, tangible storage device having computer usable program code embodied therewith, the computer program product comprising:
    computer usable program code configured to receive a request for secure route identification from an upstream node;
    computer usable program code configured to transmit a local node security level and an authentication key to the upstream node, responsive to receiving the request for secure route identification;
    computer usable program code configured to determine whether at least one downstream node is authentic and has sufficient security level from a second-level downstream node;
    computer usable program code configured to receive an address for the at least one downstream node from the upstream node, wherein the computer usable program code configured to determine whether the at least one downstream node is authentic and has sufficient security level from a second-level downstream node is based on the address for the at least one downstream node;
    computer usable program code configured to establish a socket to the upstream node;
    computer usable program code configured to request secure route identification from the at least one downstream node;
    computer usable program code configured to receive a downstream security level and a downstream authentication key from the at least one downstream node;
    computer usable program code configured to determine that the downstream security level is a sufficient security level;

computer usable program code configured to determine that the downstream authentication key is authentic; and computer usable program code configured to establish a socket to the at least one downstream node, responsive to a determination that the downstream authentication key is authentic and the downstream security level is the sufficient security level.

8. The computer program product of claim 7, further comprising:

computer usable program code configured to receive a target node from the upstream node;

computer usable program code configured to transfer a file, responsive to establishing a socket to the upstream node;

computer usable program code configured to determine that a transfer of a file from the upstream node to the target node is complete; and computer usable program code configured to tear down the socket responsive to a determination that the transfer of the file from the upstream node to the target node is complete.

9. The computer program product of claim 7, further comprising:

computer usable program code configured to transmit a target node identifier to the at least one downstream node.

10. The computer program product of claim 9, further comprising:

computer usable program code configured to log a source node identifier and the target node identifier.

11. The computer program product of claim 7, wherein requesting secure route identification further comprises:

computer usable program code configured to look up a neighbor node based on the request for secure route identification from the upstream node to form a candidate neighbor node, the request having a sufficient security level; and computer usable program code configured to request secure route identification from the candidate neighbor node, responsive to forming the candidate neighbor node.

12. A computer program product for securing a routing path, the computer program product comprising: a computer-readable, tangible storage device having computer usable program code embodied therewith, the computer program product comprising:

computer usable program code configured to receive a request for secure route identification from an upstream node;

computer usable program code configured to transmit a local node security level and an authentication key to the upstream node, responsive to receiving the request for secure route identification;

computer usable program code configured to determine whether at least one downstream node is authentic and has sufficient security level from a second-level downstream node;

computer usable program code configured to look up the at least one downstream node in a routing table; and wherein computer usable program code configured to request secure route identification from the at least one downstream node is responsive to looking up the at least one downstream node;

computer usable program code configured to establish a socket to the upstream node;

computer usable program code configured to request secure route identification from the at least one downstream node;

computer usable program code configured to receive a downstream security level and a downstream authentication key from the at least one downstream node;

computer usable program code configured to determine that the downstream security level is a sufficient security level;

computer usable program code configured to determine that the downstream authentication key is authentic; and computer usable program code configured to establish a socket to the at least one downstream node, responsive to a determination that the downstream authentication key is authentic and the downstream security level is the sufficient security level.

13. A data processing system comprising:

a bus;

a computer-readable, tangible storage device connected to the bus, wherein computer usable code is located in the computer-readable, tangible storage device;

a communication unit connected to the bus; and a processing unit connected to the bus, wherein the processing unit executes the computer usable code for securing a routing path, wherein the processing unit executes the computer usable program code to receive a request for secure route identification from an upstream node; transmit a local node security level and an authentication key to the upstream node, responsive to receiving the request for secure route identification; determine whether at least one downstream node is authentic and has sufficient security level from a second-level downstream node; receive an address for the at least one downstream node from the upstream node, wherein executing the computer usable program code configured to determine whether the at least one downstream node is authentic and has sufficient security level from a second-level downstream node is based on the address for the at least one downstream node; establish a socket to the upstream node; request secure route identification from the at least one downstream node; receive a downstream security level and a downstream authentication key from the at least one downstream node; determine that the downstream security level is a sufficient security level; determine that the downstream authentication key is authentic; and establish a socket to the at least one downstream node, responsive to a determination that the downstream authentication key is authentic and the downstream security level is the sufficient security level.

14. The data processing system of claim 13, wherein the processor further executes computer usable code to receive a target node from the upstream node; transfer a file, responsive to establishing a socket to the upstream node; determine that a transfer of the file from the upstream node to the target node is complete; and tear down the socket responsive to a determination that the transfer of the file from the upstream node to the target node is complete.

15. The data processing system of claim 13, wherein the processor further executes computer usable code to transmit a target node identifier to the at least one downstream node.

16. The data processing system of claim 15, wherein the processor further executes computer usable code to log a source node identifier and the target node identifier.

17. The data processing system of claim 13, wherein in executing computer usable code to request secure route identification, the processor executes computer usable code to look up a neighbor node based on the request for secure route identification from the upstream node to form a candidate neighbor node, the request having a sufficient security level;

and request secure route identification from the candidate neighbor node, responsive to forming the candidate neighbor node.

18. A data processing system comprising:
- a bus;
- a computer-readable, tangible storage device connected to the bus, wherein computer usable code is located in the computer-readable, tangible storage device;
- a communication unit connected to the bus; and
- a processing unit connected to the bus, wherein the processing unit executes the computer usable code for securing a routing path, wherein the processing unit executes the computer usable program code to receive a request for secure route identification from an upstream node; transmit a local node security level and an authentication key to the upstream node, responsive to receiving the request for secure route identification; determine whether at least one downstream node is authentic and has sufficient security level from a second-level downstream node; establish a socket to the upstream node; request secure route identification from the at least one downstream node; receive a downstream security level and a downstream authentication key from the at least one downstream node; look up the at least one downstream node in a routing table; wherein to request secure route identification from the at least one downstream node is responsive to looking up the at least one downstream node; determine that the downstream security level is a sufficient security level; determine that the downstream authentication key is authentic; and establish a socket to the at least one downstream node, responsive to a determination that the downstream authentication key is authentic and the downstream security level is the sufficient security level.

\* \* \* \* \*